FIG. 2
INSTRUCTION
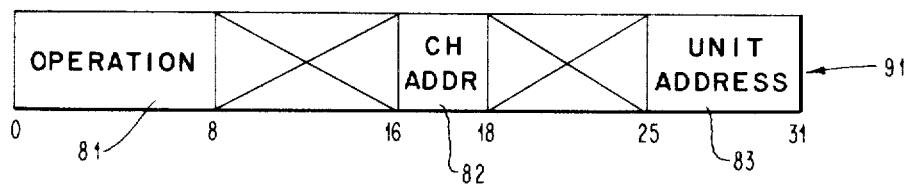
FIG. 3   CHANNEL ADDRESS WORD (CAW)
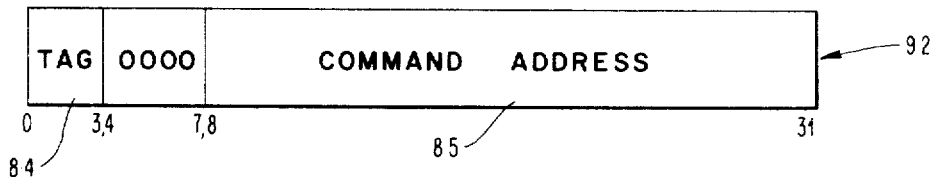
FIG. 4   CHANNEL COMMAND WORD (CCW)
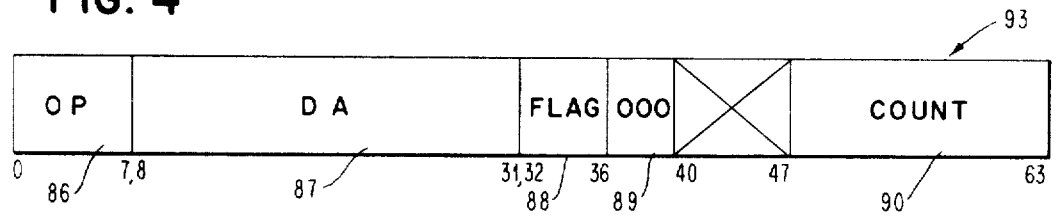
FIG. 5   CHANNEL STATUS WORD (CSW)
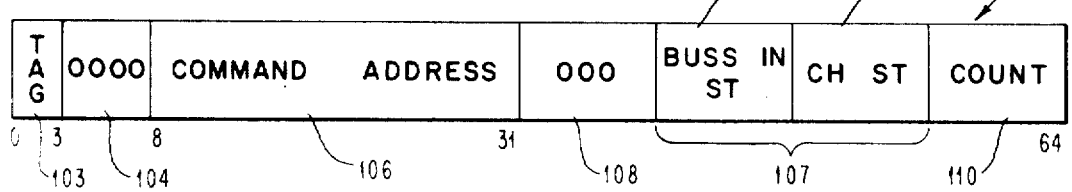

FIG. 8B

United States Patent Office 3,432,813
Patented Mar. 11, 1969

3,432,813
APPARATUS FOR CONTROL OF A PLURALITY OF PERIPHERAL DEVICES
Eugene J. Annunziata, Poughkeepsie, Robert S. James, Hyde Park, Lewis E. King, Highland, and Edwin B. Pierce, Wappingers Falls, N.Y., assignors to International Business Machines Corporation, Armonk, N.Y., a corporation of New York
Filed Apr. 19, 1966, Ser. No. 543,623
U.S. Cl. 340—172.5        13 Claims
Int. Cl. G06f 7/06

ABSTRACT OF THE DISCLOSURE

A peripheral control apparatus or channel which controls the transfer of data between input/output devices and a main memory of a data processing system. The channel performs I/O operations when instructed to do so by the data processing system by obtaining a control word from the main storage. A plurality of subchannels share a common control section which includes a local storage which is utilized to temporarily store a plurality of control words, one for each subchannel. Whenever a subchannel has data to transfer or desires to receive data, the control word associated with that subchannel is brought out of the local storage and is utilized to control the data transfer. At the end of the data transfer the control word is put back into the local storage so that the common controls are free to be utilized by another subchannel.

Two types of subchannels are disclosed. In a selector type of subchannel entire data words are transferred sequentially to the main memory until an entire block has been transferred.

In the multiplexor subchannel data bytes or portions of a word are assembled in the channel by utilizing an additional data control word which provides an assembly area for the word in the local storage. When a full word has been assembled it is transferred to the main memory.

---

This invention relates to apparatus to control the transfer of data to or from a peripheral device of a data processing system and more particularly to apparatus to control simultaneous data transfer to or from a plurality of such peripheral devices.

Peripheral control apparatus or channel apparatus are provided in data processing systems to control data transfer between an input/output device and the main storage unit of the system. The central processor or CPU of the system may initiate such data transfer by execution of a START I/O macro-instruction in response to which the channel retrieves a channel command word from storage that specifies the type of operation to be performed, the location in storage to or from where the data is to be transferred and a count indicating the number of units of data to be transferred. Once the CPU has initiated the operation, it is released to return to its own program without further interruption until the data transfer has been performed. Such a channel apparatus is disclosed in the King et al. patent application, Ser. No. 357,369, filed Apr. 6, 1964, and assigned to the assignee of the present application. That application is incorporated in the present patent application by reference. A channel apparatus of a more general type is disclosed in Christiansen et al. patent application, Ser. No. 705,447, filed Dec. 26, 1957, and assigned to the assignee of the present application.

Apparatus, of the type referred to, operates to control the parallel transfer of segments of data called bytes from a particular selected I/O device such as a hyper-speed tape unit, assemble such bytes into larger segments referred to as words or double words and, upon completion of the assembly of such a word, initiate a signal to request access to storage which when received allows the assembled word to be transferred to storage. The channel is not provided with continuous access to storage since the central processor, which is operating in parallel with the I/O data transfer, also communicates with the main storage, the CPU operation being suspended only at that time when both the CPU and the channel are simultaneously requesting storage access. As the data bytes are thus transferred to storage, the channel acts to increment the storage data address provided in the channel command word and also to decrement the count of data bytes to be transferred untilt he transfer operation has been completed. By such means, very high data transfer rates can be achieved and with the apparatus above described, as many as a million bytes of data can be transferred per second between the I/O device and storage.

The above described operation is referred to as selector or "burst mode" operation because, once the interlocking connection between the channel and the I/O device is obtained across the interface between the I/O device and the channel, that interlock is maintained until the complete data transfer operation has been achieved. When slower input/output devices are employed, such as card readers, card punches and the like, relatively high data rates are nevertheless maintained across the I/O interface by employment of what is referred to as the multiplex or "byte" mode. Channels which operate in this type of mode select a plurality of channel command words from main storage, each of which has to be specified by an instruction from the central processor and each of which is adapted to control operation of a particular but distinct I/O device. As each channel command word is retrieved from storage, operation of the associated I/O device is initiated by the channel after which each I/O device is selected according to a priority scheme when that I/O device has a byte of data ready for transfer to main storage. If a particular I/O device contains a particular byte of data which is ready to be transferred, the channel then selects, from storage, the particular channel command word controlling data transfer from that device whereupon the byte of data is transferred over the I/O interface to a buffer register in the channel and to main storage when access to main storage is obtained. During this time, the data address of the channel command word is incremented and the count thereof is decremented and the channel command word is placed back in storage whereupon the channel selects another I/O device having a byte of data ready to be transferred. An advantage of this latter type of operation is that, with slower types of I/O devices, a plurality of such devices can be put into operation and each one shall transfer a byte of data according to a given priority scheme, the data transfer from various I/O devices being in a multiplex manner to provide transfer at a data rate compatible with the data transfer rates of the faster central processor and main storage of the system with which the slower input/output devices are employed.

It will be appreciated that medium and large data processing systems can employ a large number of input/output devices of various sorts and are capable of various data transfer rates. In such a system a plurality of channel or peripheral control apparatus would be employed including a plurality of selector channels such as described in the above referred to patent application, Ser. No. 357,369, to control high speed peripheral devices as well as at least one multiplex channel to control operation of slow speed peripheral devices. In such a system, priority circuitry must be employed to control access to main storage from the various channels as well as from the PU. Since the selector channels are capable of data transfer at extremely high rates, it is desirable to attach only the highest speed peripheral devices thereto. However, there are many types of peripheral devices capable of intermediate data transfer rates which cannot be employed with the multiplex or byte mode type of channel. To most efficiently maximize the data transfer rates of all such peripheral devices, a peripheral control apparatus should have the capability of controlling peripheral devices having different data transfer rates and to do so in both the burst and multiplex modes as well as a combination thereof.

It is therefore, an object of the present invention to provide an improved peripheral control apparatus for a data processing system.

It is another object of the present invention to provide improved peripheral control apparatus for the simultaneous data transfer from a plurality of peripheral devices.

It is still another object of the present invention to provide an improved peripheral control unit for a plurality of peripheral devices operating in both burst and multiplex modes as well as a combination thereof.

It is still a further object of the present invention to provide an improved peripheral control apparatus to multiplex the operation of a plurality of peripheral devices operating in burst mode.

Because of its high data rate, the central processor normally communicates only with main storage to receive instructions for execution and also data required for computation. Once an I/O operation has started by the execution of a macro-instruction by the CPU, the control of that operation is by a peripheral control unit pursuant to a command word format which the peripheral control unit has retrieved from storage. When a word of data has been assembled by the peripheral control unit for transfer to storage, a signal is generated to request access to the storage bus which when received will suspend CPU operations, should the CPU also request access to storage at that time. When the system employs more than one peripheral control unit, different priorities will be assigned to the respective peripheral control units with the CPU being assigned the lowest priority since it is the unit with the highest data rate. When the I/O device being controlled by the peripheral control unit is of the type having the highest data rate transfer capabilities, request for access to storage by that peripheral control unit will be relatively frequent in the order of one out of every eight storage cycles. When the I/O device being controlled has a somewhat lower data rate but nevertheless is of the type that operates in burst mode, the frequency with which the peripheral control unit requests access to storage will be proportionately less.

In such a situation, the number of peripheral control units required can be reduced by provision within a peripheral control unit of apparatus to multiplex a plurality of assembled words received from a plurality of I/O devices which operate at relatively lower data rates. A feature then of the present invention resides in the provision of a plurality of subchannels to receive bytes of data from a plurality of respective I/O devices for assembly into word lengths and a buffer register within the peripheral control unit to receive such assembled words from the various subchannels according to a particular priority and from where the assembled words are transferred to the main storage bus when access thereto has been achieved by the control unit. Other features of the present invention reside in the provision within the peripheral control unit of storage of the various command words required to control simultaneously the operation of a number of I/O devices that nevertheless may operate in burst mode. Still another feature of the present invention resides in the provision of a multiplex subchannel to control the operation of a number of slow rate I/O devices and from which data transfer is multiplexed over a single I/O interface one byte at a time for assembly into larger segments of data.

These and other objects, advantages and features of the present invention will become more readily apparent from the following specification when taken in conjunction with the drawings wherein:

FIGURE 2 is a diagram of the format of the Start I/O instruction executed by the CPU to initiate peripheral operation;

FIGURE 3 is a diagram of the format of channel address word employed by the present invention to retrieve channel command word;

FIGURE 4 is a diagram of the format of the channel command word employed by the present invention;

FIGURE 5 is a diagram of the format of the channel status word employed by the present invention;

FIGURES 8a and 8b are schematic diagrams of the control circuitry of the present invention;

Figure 1:
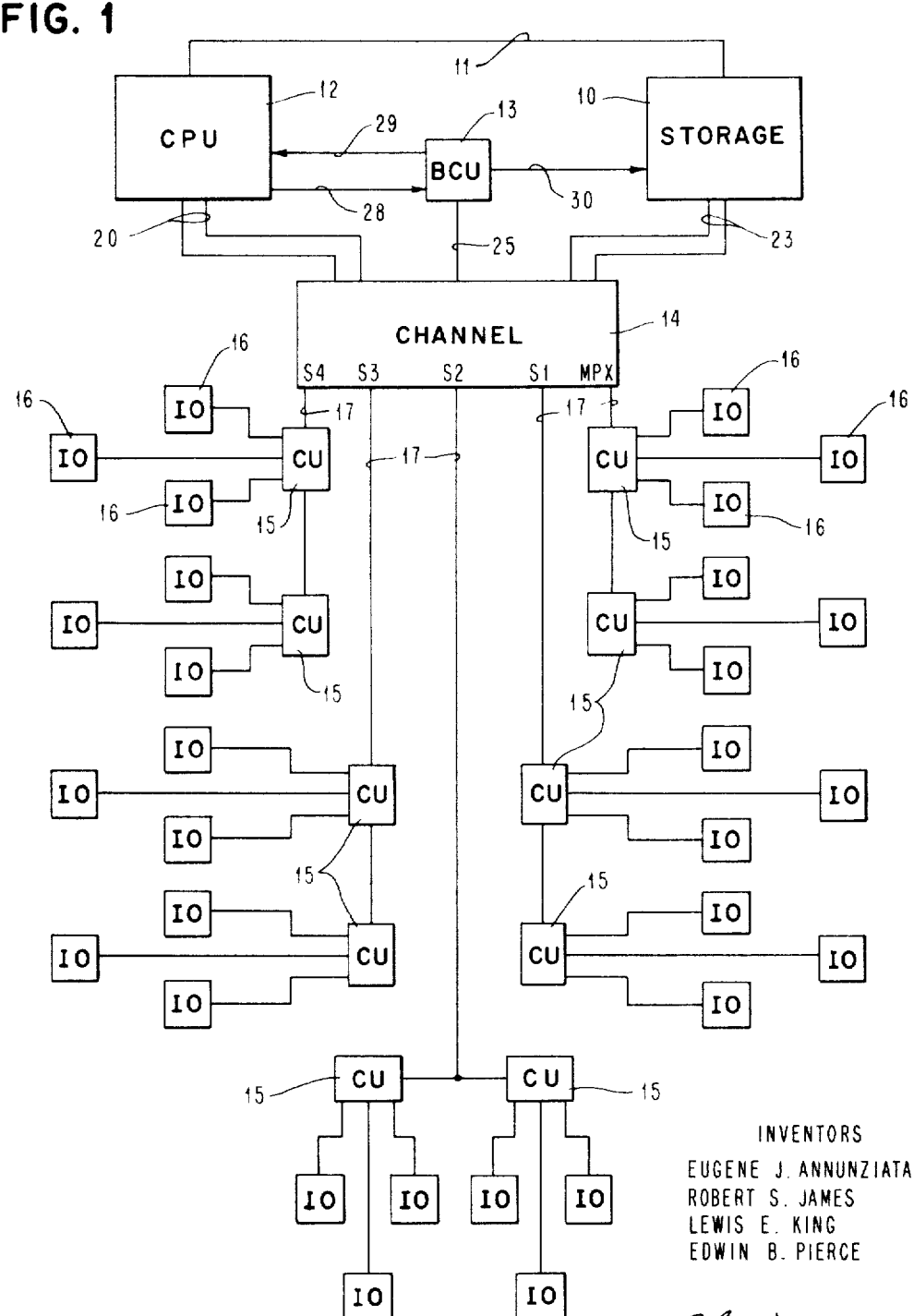
FIGURE 1 is a schematic diagram of a data processing system which employs the present invention.

Referring to FIGURE 1, an information processing system of the form contemplated by the present invention includes a main core storage unit 10 connected through a suitable bus 11 to a central processing unit CPU 12. A plurality of switching units 15 individually govern a plurality of connected input/output devices 16. The switching units are connected through an I/O interface bus 17 of 28 lines. The bus 17 also includes a priority selection bus (not shown) since plural units time share the bus 17. Each I/O interface bus connects to a channel 14. Channel 14 is connected to the CPU through a CPU interface 20.

Each channel unit is connected to the storage unit 10 by way of a storage interface 23 which is operated as a multiplexed bus by a bus control unit 13, described, for example, in IBM Customer Engineering Instruction-Reference-7090 Data Processing System, published 1961 by International Business Machines Corporation, pages 28 through 44. A bus control interface 25 interconnects channel 14 and bus control unit 13. Completing the bus control unit connections are storage bus 30 and a CPU bus in 29 and bus out 28.

Before describing the general detailed construction and operation of the channel, it is believed in order to describe the format of binary code combinations which serve as instructions, commands and control orders to initiate the operation of the channel in directing the flow of information between I/O devices and main storage. An instruction is prepared by the CPU and, afer decoding, executed by the channel. The instruction may be a start I/O, halt I/O, test I/O, or a test channel. Commands are fetched from memory by the channel when a start I/O instruction is received. Commands, after decoding, initiate I/O operation. The channel is capable of executing write, read, read backwards, control, sense and transfer in channel commands. A control command indicates an operation at an I/O device that does not involve transmission of data, e.g., backspacing or rewinding magnetic tape.

Referring to FIGURE 2, an instruction format 91 is indicated as comprising 32 binary bit positions. The instruction format comprises an operation code field 81, a channel address field 82 and a device or unit address field 83. The operational code is eight binary bits and may describe a START I/O, TEST I/O, HALT I/O and TEST CHANNEL operation. Eight through fifteen and eighteen through twenty-five of the instructions are ignored. The channel address field comprises three binary bits and the device address comprises eight binary bits.

A START I/O operation directs the channel to enter storage at a designated location and obtain a channel address word (CAW), the format of which is in FIGURE 3.

Essentially, the CAW 92 is an indirect address providing the location of the desired command. The CAW, as indicated in FIGURE 3, has 32 binary bit positions including a tag field 84 and a command address field 85. The tag field 84 has four bits which control the access to the memory area in which the I/O operation, i.e., read, write, read backward, etc., will be performed. The command address field 85 specifies the location of a command control word (CCW) which describes the particular I/O operation to be performed. The bit positions 4 through 7 must be binary zeros for CAW validity purposes.

Referring to FIGURE 4, a channel command word (CCW) 93 format of 64 bit positions plus 8 parity bits (not shown) includes an operation code field 86 of eight bits; a data address field 87 of 24 bits; a flag field 88 of five bits; a buffer field 89 of three bits, and a count field 90 of 16 bits. The bit positions 40 through 47 are ignored. The command field 86 specifies the operation, i.e., read, write, etc., to be performed. The data address field 87 specifies an eight byte storage location in the main storage where the data is to be stored or read. The count 90 specifies the number of data bytes to be processed. Bit positions 37-39 indicate the validity of the CCW. The flag field 88 comprises a chain data address flag bit, a chain command flag bit, a suppress incorrect length indication flag bit, a skip bit, and a program control interruption flag bit.

Referring to FIGURE 5, a channel status word (CSW) 101 format comprises a memory tag field 102, a buffer field 104, a command address field 106, a buffer field 108 and count field 110, a status field 107 comprising a device field 109 and a channel field 116. The CSW provides to the program the status of an I/O device or the conditions under which an I/O operation has been terminated. The tag field 102 contains the memory area location in which the operation was being performed. The command address field 106 specifies an addres that is eight bytes higher than the last command address used in the operation being performed. The eight bit devices status field 107 describes the status of the I/O device presently connected to the channel. The conditions indicated by the field 109 are attention, control unit end, busy, channel end, device end, unit check and unit exception. Each condition may be modified by the presence of modifier bits.

The format of the above described instructions and command words as well as the various interfaces between the channel and connecting units (that is, the I/O interface, the CPU-channel interface, and the like) have been designed to accommodate operations according to a particular systems architecture in the same manner as described for the channel apparatus of the above referred to King et al. patent application, Ser. No. 357,369, and reference is made thereto for detail description of these operations. As distinct from the channel of the King et al. application, the present invention also utilizes another set of conrtol words referred to as unit control words and which are formed in part from the channel command word specifying the operation of each peripheral device under control. With certain exception, there are provided four such unit control words for each peripheral device, which control words are stored in a local storage within the channel that will hold 1024 of such words of 64 bits each plus eight parity bits. Thus, the present device can theoretically control the operation of 256 peripheral devices although the actual number of such devices controlled will be less because of certain limitations in the addressing that will be explained later. The local storage address will comprise 10 bit positions of which 8 will represent a unit address of the particular device and the last 2 bits will be employed to designate the particular one of the four possible control words stored in local storage for the device. Whenever a particular device requires service, its address will be presented on the local storage address bus along with two additional bits to signify the particular unit control word to be retrieved.

Figure 6:
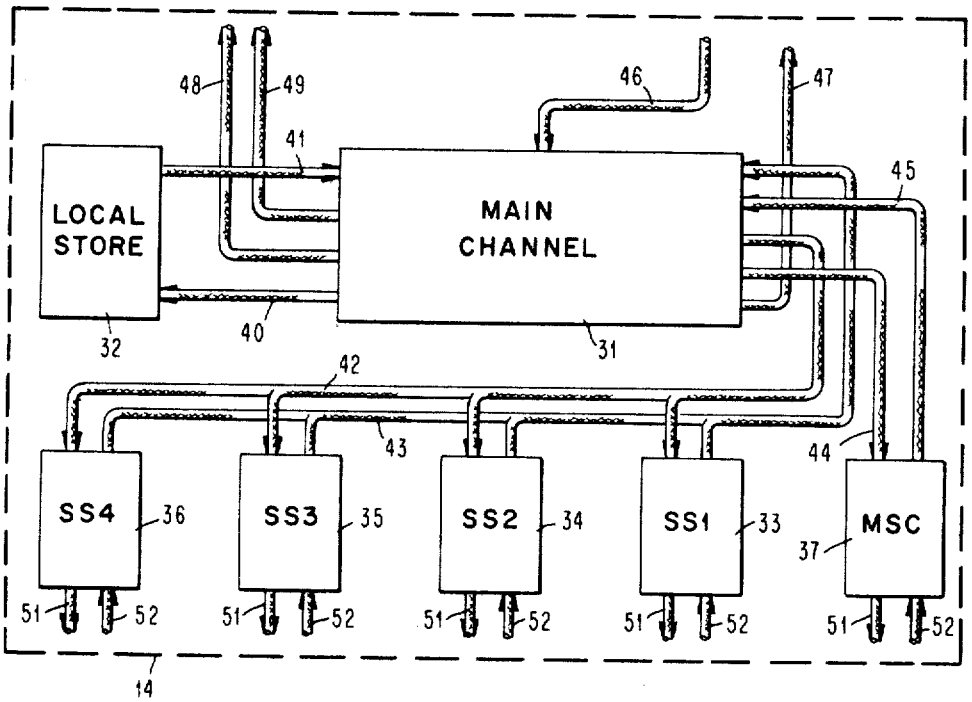
FIGURE 6 is a schematic diagram of the present invention.

The various units of the channel of the present invention are illustrated in FIGURE 6 including main channel 31 that contains the common data registers and controls, local storage 32 in which the various unit control words are stored, selector subchannels 33 through 36 and multiplex subchannel 37. The interconnection between the various units include local storage bus IN 40 and local storage bus OUT 41 between local store and main channel 31, selector subchannel (SSC) bus OUT 42 and SSC bus IN 43, multiplex subchannel (MSC) bus OUT 44 and MSC bus IN 45. Main storage bus OUT 46 and main storage bus IN 47 comprise the channel storage interface 23 of FIGURE 1 while storage address bus 48 is a part of the channel-BCU interface 25 of FIGURE 1 and unit address bus IN 49 and unit address bus OUT 50 are a part of channel-CPU interface 20 of FIGURE 1. Busses OUT 51 and busses IN 52 to the respective subchannels form a part of the standard I/O interfaces 17 of FIGURE 1.

The present invention is designed to operate with a system one of the architectural features of which is a standardized data path width of 8 bits which will be referred to hereinafter as a byte. Many data paths will have larger widths which nevertheless in general will be multiples of this unit, the largest width being 8 bytes or 64 bits. As a practical matter each data path will have an additional parity bit for each byte of data; however, this feature is not pertinent to the present invention and in general will not be discussed.

The various busses described above and to be described below will contain different numbers of conductors, or stated differently, the various busses will have different data path widths. The widths of the various data paths can be readily determined from the drawing by observation of the registers to which they are connected. For example, in FIGURE 7, main storage bus OUT 46 will be observed to have a data path width of 64 bits since it connects to the 64 bit input register 121. Similarly, the bus OUT 42 to the selector subchannels will also have a data path width of 64 bits since it is connected to data register 122 which contains 64 bits. However, bus IN 45 from the multiplexer channel will be observed to have a data path width of only 8 bits since it is coupled to eight bit wide registers which are the byte registers that make up data register 122. The gating circuitry employed to gate the various bytes of data into the respective portions of such registers have not been shown but will be understood to be of the type well known in the art. Such gating will be accomplished at the time of data transfer from one register to another under the control of a clock source, not shown, but may be of a type well known in the art. Normally, this clock will not be in operation but will be started up whenever a START I/O instruction is executed by the CPU or when a service request is initiated by one of the peripheral devices under control by the channel.

Figure 7:
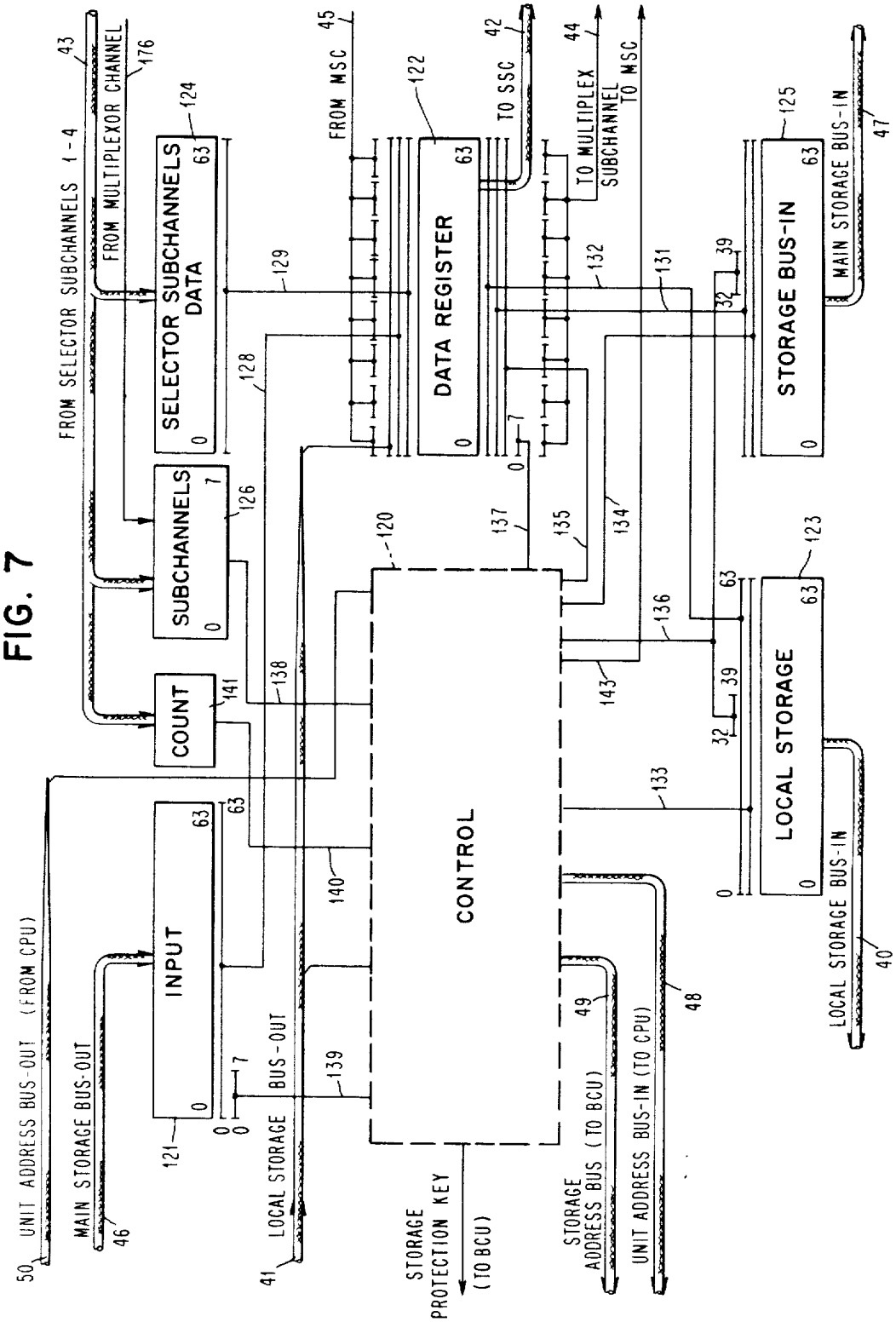
FIGURE 7 is a schematic diagram of the instruction and data flow paths of the present invention.
Figure 8A:
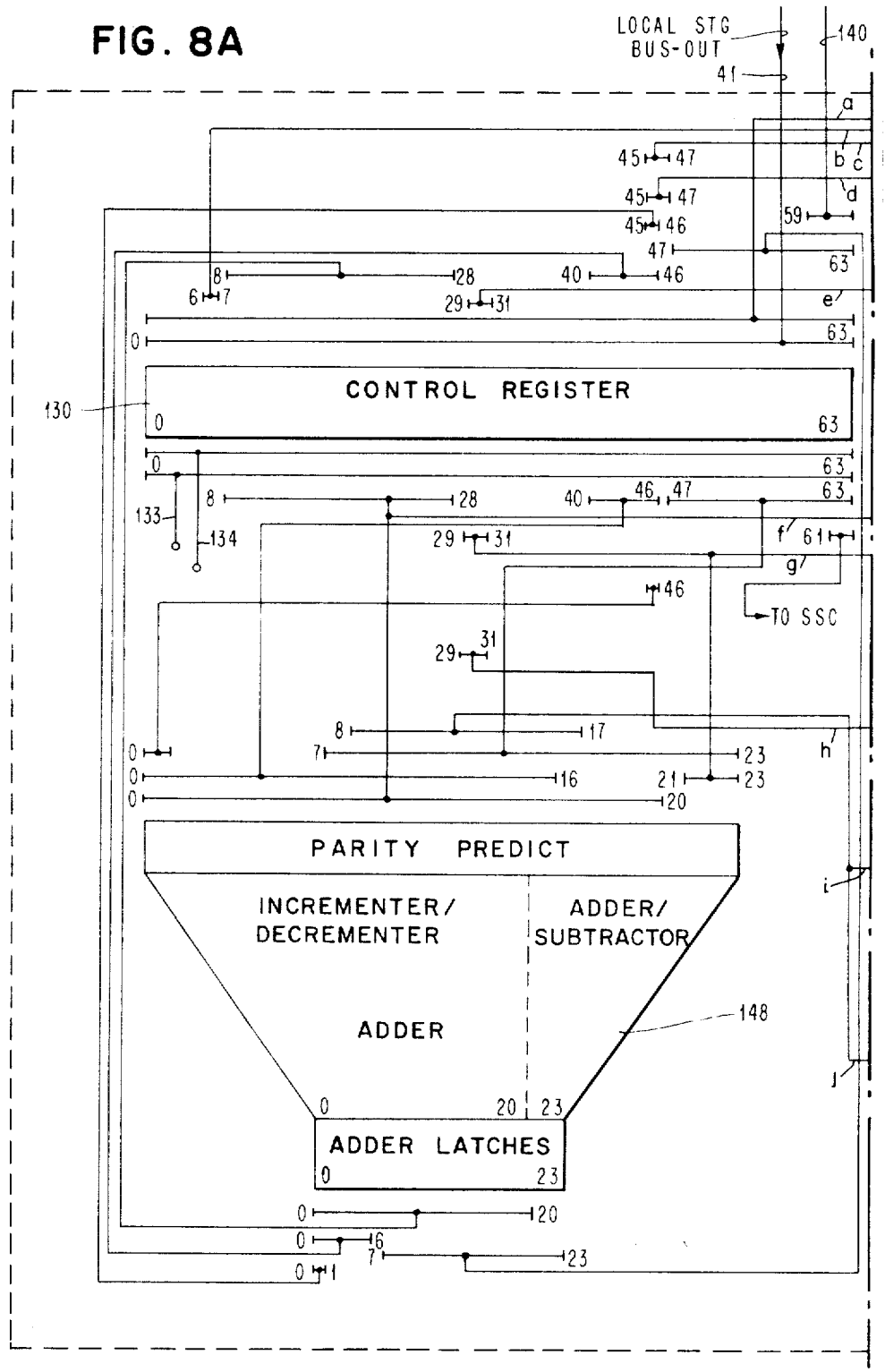
Figure 8B:
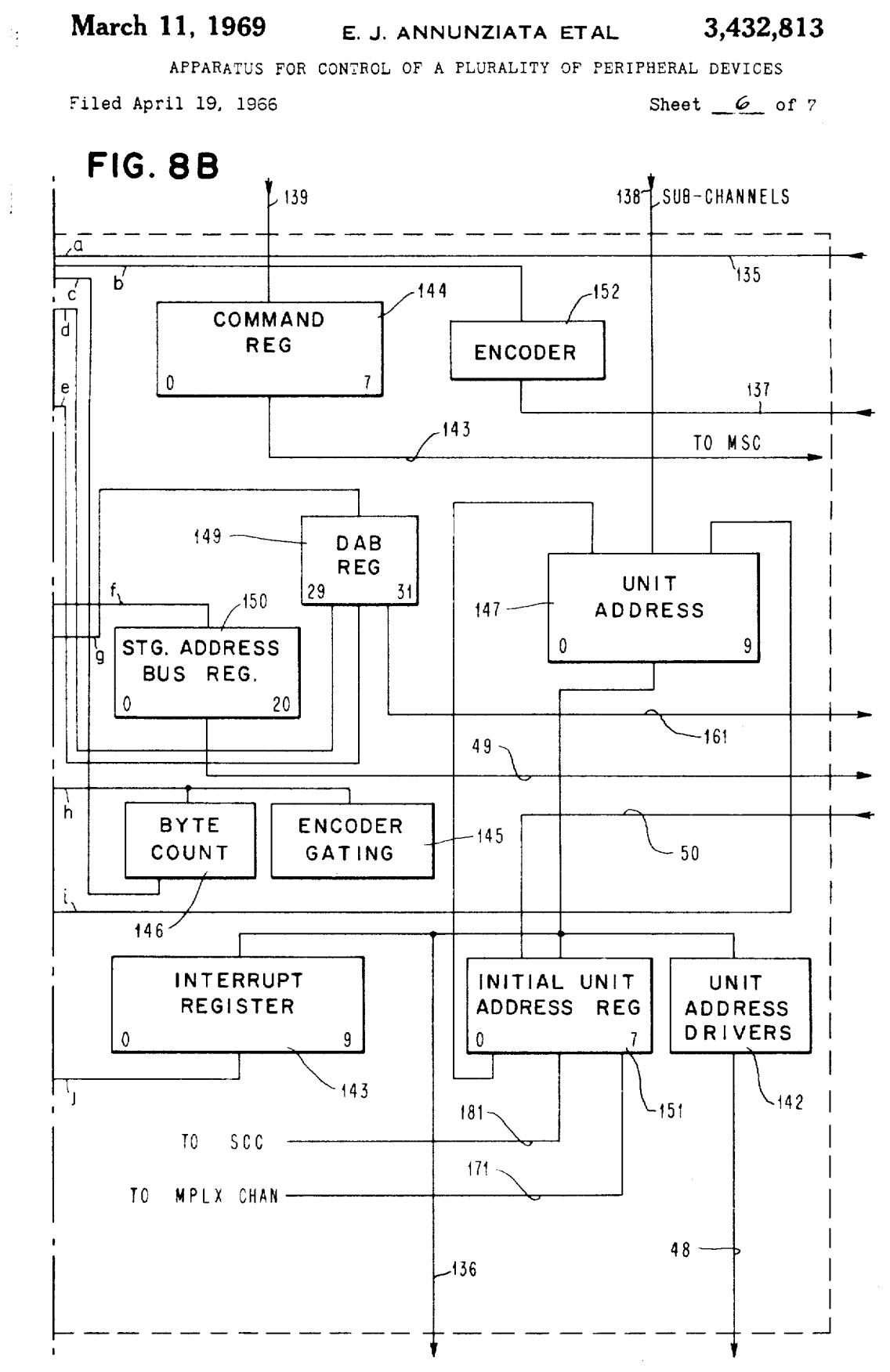

In order to describe the various functions of the units referred to above as well as the significance of the various fields of the control words, reference is now made to FIGURE 7 which is a schematic diagram of the common data paths and registers and to FIGURES 8a and 8b which constitute a schematic diagram of the control circuitry of the channel. Since the common registers and data paths cooperate with the circuitry of the various subchannels, reference from time to time will also be made to FIGURE 9 which is a schematic diagram of the registers and ata path of the multiplex subchannel and to FIGURES 10 and 11 which are schematic diagrams of the data paths and control registers of the respective selector subchannels.

When the CPU executes a macro-instruction of the type illustrated in FIGURE 2 where the operation field 81 specifies a START I/O type operation, the particular channel involved will be selected according to channel address field 82 and a START I/O line within the CPU interface 20 of FIGURE 1 will be employed to signal that operation to the channel, it being understood that the system will most likely employ a plurality of channels both of the type of the present invention and of the selector type described in the above referred to King, et al. application, Ser. No. 357,369. The unit address from field 83 of the macro-instruction will then be transmitted over unit address bus OUT 50 of interface 20 to control section 120 of FIGURE 7 and within this section to initial unit address register 121 for transmission to the particular subchannel to which the peripheral unit is attached. A fixed storage address is forced on to the storage address bus 49 of FIGURE 7 to retrieve the channel address word from main storage. This channel address word is received by input register 121 of FIGURE 7 over main storage bus OUT 46 and transferred to data register 122 of FIGURE 7 and then to control register 130 of FIGURE 8a. Since the channel address word comprises 32 bits plus parity, it will occupy bit positions 0 through 31 in control register 130. The command address field 85 of this word (see FIGURE 3) is transferred to storage address bus register 150 of FIGURE 8b and over storage address bus OUT to main storage to retrieve the channel command word. In the meantime, the address field contents of control register 130 are transferred to adder 148 to increment the address by 8 (that is one full word of 8 bytes) and back to control register 130. From there the contents of register 130 are transferred to local storage register 123 of FIGURE 7 and to local storage to form the first unit control word for the particular peripheral unit selected.

When the channel command word is received by input register 121 of FIGURE 7 from main storage bus OUT 46 it is transferred to data register 122. The operation field 86 thereof (see FIGURE 4) is transferred to the particular sub-channel and to peripheral unit and also to encoder 152 of FIGURE 8b from where the last two bits thereof are transferred to control register 130. The remaining portion of the command word is also transferred to control register 130 with the exception of the first five bits of the operation field which are now replaced by the protection keys of tag field 84 (see FIGURE 3) of the channel address word which have been retained in the control register 130. The contents of the control register are now transferred to local storage register 123 of FIGURE 7 and to local storage to form the second control word for the particular peripheral unit selected. If this peripheral unit is attached to a selector subchannel, only the above described two unit control words are required. However, if the peripheral unit is attached to the multiplex subchannel, two other control words will be employed as described below for multiplex operation.

The above described routine will be followed for the selection of each peripheral unit by the execution of a start I/O instruction by the CPU. Once the peripheral unit has been selected on its I/O interface and the various unit control words are stored in local storage, the CPU is released to resume its own program and the channel of the present invention controls the operation of the various peripheral units as will now be described.

After the respective peripheral units have been selected as described above, they will be in operation transmitting data over their respective I/O interfaces one byte at a time. The manner in which the present invention receives data over the respective I/O interface for assembly and transmission to main storage will now be described, first for the selector subchannel operation and then for the multiplex subchannel operation.

Figure 10:
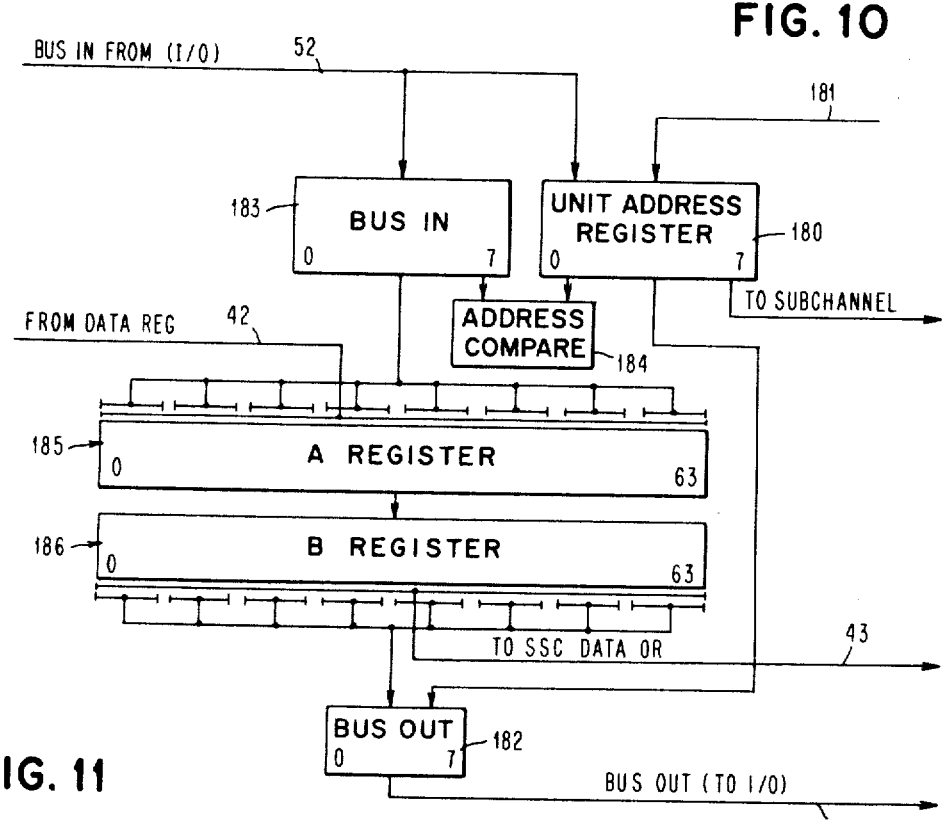
FIGURE 10 is a schematic diagram of a selector subchannel employed in the present invention.
Figure 11:
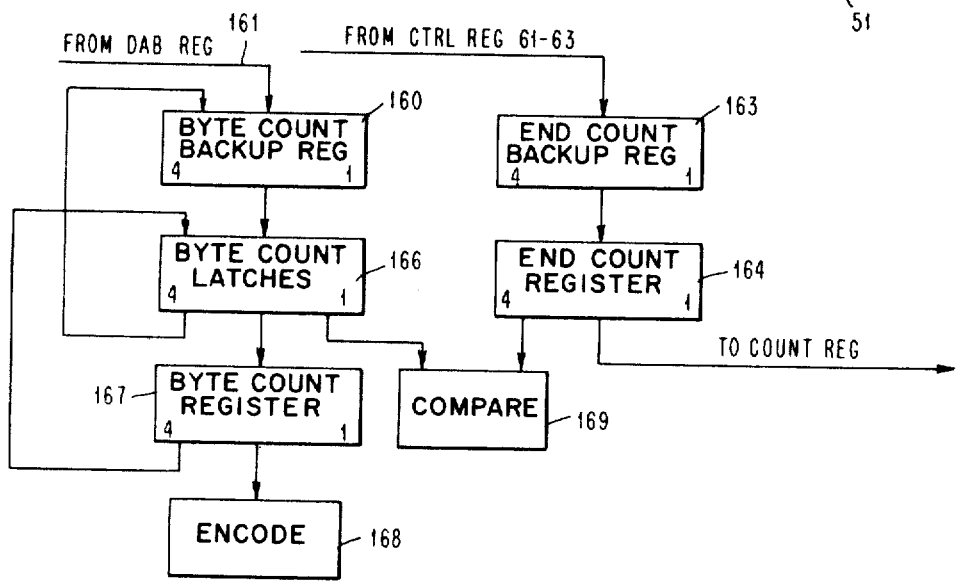
FIGURE 11 is a schematic diagram of the byte and count registers employed by the selector subchannel of the present invention.

Referring now to FIGURE 10 which illustrates the data flow paths for a selector subchannel and to FIGURE 11 which illustrates the count register for control of the assembly of the incoming 8-bit bytes into 64 bit words, selector subchannel operation will now be described. During the selection operation of the peripheral device, the device or unit address is received from register 151 of FIGURE 8b over bus 181 and placed in unit address register 180 of FIGURE 10. From this register the unit address is sent to bus OUT register 182 and transmitted to the selected device over I/O bus OUT 51. When a device acknowledges its acceptance to establish the I/O interlock, it sends its address back over I/O bus IN 52 to bus IN register 183 and if comparison is achieved in address compare unit 184, the operation code is then transmitted to the device as was explained above. The device then begins to transmit bytes of data over I/O bus IN 52 to bus IN register 183 from where they are gated into one of the 8 byte locations of A register 185. The particular gating circuitry is not shown but will be of the type well known in the art. The initial byte location in A register 185 is determined by the last three bits of the data address field 87 of the channel command word (see FIGURE 4). These bits are transferred from control register 130 of FIGURE 8a (at the time the channel command word resides in that register) to data address bus register 149 of FIGURE 8b and over bus 161 to byte count back-up register 160 of FIGURE 10. In a similar manner, the end count which indicates the last byte position in A register 185 to receive a byte of data is determined by the last three bits of count field 90 of the channel command word (see FIGURE 4) which are transmitted from control register 130 of FIGURE 8a over bus 162 to IN count back-up register 163 and END count register 164. The byte count is transmitted from back-up register 160 to byte count latches 165 and to byte register 166 from where it is decoded by encoder 167 to set the appropriate gates to gate data into the particular byte location of A register 185 of FIGURE 10. As each byte of data is transmitted from I/O bus IN 52 to A register 185, the byte count is incremented by 1 and returned to byte count latches 166 for comparison with the contents of end count register 164. Thus the A register will be filled with bytes starting at a particular byte location initially specified until the byte count equals zero or the end count as determined by comparator 169 of FIGURE 11 at which time the contents of A register 185 of FIGURE 10 are transferred to B register 186 and a signal is sent to main channel to request access to data register 122 of FIGURE 7. This access is determined by priority circuitry and it will be remembered that the other selector subchannels are also engaged in assembling data bytes and requesting access to the main channel.

When such access is obtained, the appropriate unit control word is retrieved from local storage over local storage bus OUT 41 to control register 130 of FIGURE 8b and the contents of B register 186 of FIGURE 10 are transferred over selector subchannel bus 43 to register 124 of FIGURE 7 and to data register 122. At this point access is requested of main storage and the data access field 87 of the command word in register 130 (see FIGURE 4) is transferred to storage address bus register 150 of FIGURE 8b and over storage address bus 49 to the bus control unit 13 of FIGURE 1. When a main storage cycle is obtained, the contents of data register 122 are transferred to storage bus in register 125 over main storage bus IN 147 to main storage. At this time, the contents of end count register 164 are transferred to count register 141 of FIGURE 7 and to control register 130, the data address field 87 (see FIGURE 4) is transferred from control register 130 to adder 148 where it is incremented by a count of 8 and returned to control register 130. The count field 90 of the command word is similarly tarnsferred from control register 130 to adder 148 where it is decremented by a count of 8 and returned to control register 130 whereupon the contents of control register 130 are transferred to local storage register 123 of FIGURE 7 and placed back in local storage at the same address from which it was retrieved, this procedure being repeated for each selector subchannel when that subchannel has an assembled word to transfer to main storage.

The above procedure was descriptive of the operation of transferring data from a peripheral device to main storage. When the operation is to transfer data from main storage to the peripheral device, the procedure will be reversed whereby the whole data word is transferred over main storage bus 46 of FIGURE 7 to input register 121 of FIGURE 7 and then to data register 122. From there, the contents of data register 122 are transferred over bus 42 to A register 185 of FIGURE 10 and to B register 186 from which the contents are gated out one byte at a time to bus OUT register 182 and over bus OUT 51 to the peripheral device, the selection of the peripheral device and the control of the data transfer being under the control of the unit control word in control register 130 of FIGURE 8a which was retrieved from local storage in the same manner as described above for the write-in operation with the respective data address fields and count fields being respectively incremented and decremented as was described above for the write-in operation.

The above description of selector subchannel operation pertains primarily to the control of those peripheral devices which have relatively high data transfer rates and it will be understood that in such circumstances, once the peripheral device is selected and started up, it will remain attached to its particular selector subchannel by the I/O interface interlock and no other device coupled to that subchannel can be placed in operation until the particular selected peripheral device has finished its own operation. Thus, since there are only four selector subchannels, only four peripheral devices characterized by relatively high data transfer rate can be placed in operation at one time with the channel of the present invention. However, the slower peripheral devices attached to the multiplex subchannel can all be operated simultaneously in the manner which will now be described.

Any peripheral device attached to the multiplex subchannel is placed in operation in the same manner as any other peripheral device which is attached to one of the selector subchannels. That is to say, the CPU must execute a start I/O macro-instruction whereupon the channel retrieves a command address word and then a channel command word while the unit address of the start I/O macro-instruction is sent to the channel and to peripheral device. The channel command word is received by the main channel and stored as is the channel address word to form the first two unit control words for the particular peripheral device. Each time the device requires service, the channel command word is retrieved from local storage and placed in a control register of the main channel for appropriate updating.

Figure 9:
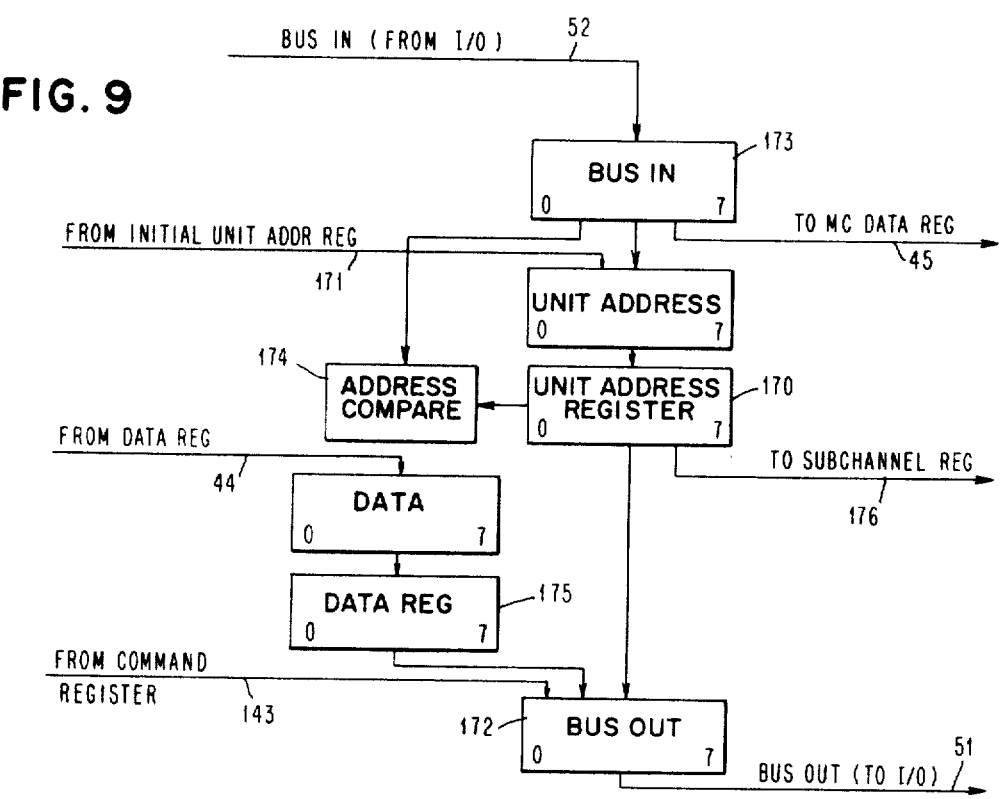
FIGURE 9 is a schematic diagram of the multiplex subchannel of the present invention.

Referring now to FIGURE 9, the selection of the particular peripheral unit is accomplished by receipt of the unit address from register 151 of FIGURE 8b over bus 171 to unit address register 170 from where it is transferred to bus OUT register 172 for transfer to the peripheral unit over I/O interface bus OUT 51. When the unit acknowledges its selection, it returns its address over I/O bus IN 52 to bus IN register 173 where appropriate selection is indicated by comparison of the contents of register 173 in unit address register 170 by address comparator 174. The operation code was obtained from input register 121 when the channel command word resided therein and then transferred to command register 144 of FIGURE 8b and is now transferred over bus 143 to data register 175 of FIGURE 9 and to bus OUT register 172 to the I/O bus OUT 151. The peripheral unit is now in operation and when it has a byte ready for transfer, it signals the channel over the I/O interface by particular circuitry, not shown, whereupon the channel retrieves the channel command word (now a unit control word) from local storage according to the address of the particular device requesting service. This is done by the device placing its address on bus IN 52 of FIGURE 9 and into unit address register 170 from where it is transferred over bus 176 to subchannel register 126 of FIGURE 7 and to unit address register 147 of FIGURE 8b.

While the selector subchannels' peripheral devices require two unit control words as were described above, four unit control words are employed for multiplex operation, the channel address word and the channel command word form the unit control words 1 and 2. The third unit control word is a data word which is assembled from the bytes transmitted from a particular peripheral device through the multiplex subchannel as will now be described. When the peripheral device has indicated that it has a byte of data to be transferred as indicated above, the channel command word or second unit control word is transferred from local storage to control register 130 of FIGURE 8b and the third unit control word containing any previously received bytes of data is transferred from local store over local storage bus OUT 31 to data register 122. At this point, the byte of data is received over I/O bus IN 52 by bus IN register 173 of FIGURE 9 from which it is transferred over bus 45 to data register 122 of FIGURE 7 and into the next open byte location as determined by the last three bits of the data address field 87 of the channel command (see FIGURE 4) which three bits have been transferred from control register 130 to byte count register 146 and to encoder gating 145. After the byte of data has been received in data register 122, the data address field 87 of the second unit control word or channel command word is transferred to adder 148 where it is incremented by 1 and returned to control register 130 and at the same time the count field 90 of this unit control word (see FIGURE 4) is transferred to adder 148 where it is decremented by 1 and returned to the control register 130. At this point the contents of control register 130 are returned to the second unit control word location in local storage for the particular peripheral device and the contents of the data register are also transferred via local storage register 123 and local storage bus IN 140 to local storage as the third unit control word of the particular peripheral unit. When the peripheral unit is again ready to transfer a byte of data or when another peripheral unit in operation is ready to transfer a byte of data, the same procedure is repeated for that unit. When 8 bytes of data have been assembled as the third unit control word in the manner described, access to main storage is requested and when a main storage cycle is obtained, the contents of the data register are then transferred to data storage bus IN register 125 and over main storage bus IN 47 to main storage.

The above description has been for the transfer of data from a peripheral device to main storage. When the operation is one of transferring data from main storage to a peripheral device, the respective command words are formed as they were described above, however the data flow is one of a full word being transferred from main storage over main storage bus OUT 46 of FIGURE 7 to input register 121 and then to data register 122. After a byte of data has been gated from data register 122 over multiplex channel bus OUT 44 under the control of the unit control word then in the control register 130 of FIGURE 8a, the contents of control register 130 are transferred to local storage as the second unit control word while the contents of data register are transferred to local storage as the third unit control word. The byte of data that has been transferred from data register 122 transferred to data register 176 of FIGURE 9 and bus OUT register 172 for transfer over I/O bus OUT 151 to the peripheral device.

The fourth unit control word employed for multiplex channel operation is a new channel command word which has been prefetched from main storage and is placed in local store to continue the control of the particular peripheral device when data chaining is indicated by the appropriate flag bit of flag bit 88 of the current channel command word (see FIGURE 4).

One further feature of the present invention remains to be described and that is the interruption of the CPU by the channel when certain conditions are indicated by the peripheral device which conditions are represented in the channel status word as described above. It will be noted that the channel status word is primarily formed of the updated channel address word plus certain status bits and also a count. Normally, these respective bits and fields are stored as the first unit control word for the particular device. The device may initiate a request for the channel, for example when it has completed its data transfer. If a chain command or chain data flag appears in the channel command word or storage unit word 2, the command address of the first unit control word is retrieved from local storage and ultimately placed on storage address bus register 150 and storage address bus 49 to the BCU to request a new channel command word residing at that updated storage. If such a chaining flag is not present in the channel command word, other conditions may exist that will cause interruption of the CPU. This is accomplished by the channel presenting its unit address to the subchannel and then to unit address register 147 in FIGURE 8b from where it is transferred to interrupt register 143. When the CPU has finished its current instruction, and the channel has established access to the CPU according to a priority scheme when other channels are competing for access, the unit address is transferred to unit address drivers 142 and over unit address bus IN 48 to the CPU. The channel status word is placed on storage bus IN 125 of FIGURE 7 and main storage bus IN 47 to main store.

As thus described, the present invention is capable of initiating the operation of up to 192 peripheral devices to transfer data to or from main storage, one byte at a time, which data transfer is multiplexed with all devices operating simultaneously and connected to a single multiplex subchannel. Further, the invention controls the operation of four other peripheral devices to transfer data to or from main storage at a higher speed which four devices are selected from individual groups of 16 each and are connected to individual selector subchannels wherein the particular bytes are received and assembled into eight byte segments, the respective segments then being multiplexed across the channel-storage interface. The operation of each device is started by the macro-instruction initiated by the CPU; however, once started the data transfer is controlled by the main channel of the present invention which selects from a local storage, the particular unit control words required for each device.

While the invention has been particularly shown and described with reference to the preferred embodiment thereof, it will be understood by those skilled in the art that changes and modifications in form and detail may be made without departing from the spirit and scope of the invention as claimed.

What is claimed is:

1. A peripheral control unit for a data proocessing system including a central processor having means to execute an instruction, a main storage unit and a plurality of peripheral devices, said peripheral control unit comprising:
   a plurality of subcontrol units to each of which a plurality of peripheral devices are attached for the transfer of data segments thereto, at least one of said subcontrol units having a register to receive said data segments for assembly;
   common control means coupled to each of said subcontrol units and responsive to the execution of an instruction by said central processor to retrieve a unit control word from said main storage to initiate data transfer at a particular selected peripheral device; and
   a local storage means connected to said control means for storage of said unit control word until said corresponding peripheral device has transferred a predetermined number of data segments.

2. A peripheral control unit according to claim 1 wherein said local storage is adapted to receive a separate unit control word for each of said plurality of said peripheral devices.

3. A peripheral control unit according to claim 1 wherein one of said subcontrol unit is adapted to transfer separate data segments, one at a time to or from particular selected ones of said peripheral devices attached thereto and wherein said control means is adapted to retrieve from local storage a particular one of a plurality of unit control words for the selected device when said data segment is ready for transfer.

4. A peripheral control unit according to claim 3 wherein said unit control word contains manifestations representing the total count of data segments to be transferred from the corresponding peripheral device and the location address in main storage to or from which said segment is to be transferred and said control means is adapted to increment said storage location address and decrement said count upon the transfer of said data segment.

5. A peripheral control unit for a data processing system including a central processor having means to execute an instruction, a main storage unit and a plurality of peripheral devices, said peripheral control unit comprising:
   a plurality of subcontrol units to each of which a plurality of peripheral devices are attached for transfer of data segments;
   common control means coupled to each of said subcontrol units and including a data register to receive a predetermined number of data segments from a particular subcontrol unit to which a particular selected peripheral device is attached, a control register to receive a unit control word retrieved from main storage in response to execution of an instruction by said central processor which control word contains manifestations representing the total count of data segments to be transferred to or from the corresponding peripheral device and the location address in main storage to or from which the first of said segments is to be transferred; and
   a local storage means connected to said control means for storage of said unit control word until said predetermined number of data segments are to be transferred.

6. A peripheral control unit according to claim 5 wherein said control means further includes means to increment said storage address and decrement said count upon the transfer of the predetermined number of data segments.

7. A peripheral control unit according to claim 5 wherein each subcontrol unit includes a register to receive a data segment from a selected peripheral device for transfer to said data register, at least one of said subcontrol unit registers being adapted to receive and assemble a predetermined number of such data segments which predetermined number is greater than one.

8. A peripheral control unit according to claim 5 wherein said local storage is adapted to receive a separate unit control word for each of said plurality of peripheral devices after initiation of data transfer by said devices, and said control means is adapted to retrive from local storage a particular unit control word for a selected device when the corresponding subcontrol unit contains said predetermined number of data segments.

9. A peripheral control unit for a data processing system including a central processor having means to execute an instruction, a storage unit and a plurality of peripheral devices, said peripheral control unit comprising:

a plurality of subcontrol units to each of which a plurality of peripheral devices are attached for transfer of data segments, each of said control units including a register to receive and assemble a predetermined number of data segments from a particular selected peripheral device;

common control means coupled to each of said subcontrol units and including a data register to receive said predetermined number of data segments from a selected subcontrol unit, the data transfer by the particular peripheral device attached to that control unit being initiated pursuant to a unit control word retrieved from main storage in response to the execution of an instruction by said central processor; and a local storage means connected to said control means for storage of said unit control word until said corresponding subcontrol unit has received said predetermined number of data segments.

10. A peripheral control unit for a data processing system including a central processor having means to execute an instruction, a storage unit and a plurality of peripheral devices, said peripheral control unit comprising:

a plurality of subcontrol units to each of which a plurality of peripheral devices are attached for transfer of data segments, each of said control units including a register to receive and assemble a predetermined number of data segments from a particular selected peripheral device;

common control means coupled to each of said subcontrol units including a data register to receive said predetermined number of data segments from a selected subcontrol unit, and a control register to receive a unit control word retrieved from main storage in response to execution of instruction by said central processor which control word contains manifestations representing the total count of data segments to be transferred to or from the corresponding peripheral device and the location address in main storage to or from which the first of said segments is to be transferred; and a local storage means connected to said control means for storage of said unit control word until said corresponding subcontrol unit has received said predetermined number of data segments.

11. A peripheral control unit according to claim 10 wherein one of said subcontrol units is adapted to transfer separate data segments, one at a time, to or from particular selected ones of said peripheral devices attached thereto and wherein said control means is adapted to retrieve from local storage a particular one of a plurality of unit control words for the selected device when said data segment is ready for transfer.

12. A peripheral control unit according to claim 11 wherein said common control means is adapted to receive said separate data segments from said one subcontrol unit for assembly.

13. A peripheral control unit according to claim 12 wherein said common control means is adapted to transfer the thus assembled data segments to the location in local storage upon receipt of the last assembled data segment, the assembled data segments to be retrieved from local storage and transferred to said data register when the particular selected peripheral device is ready to transfer another data segment.

References Cited

UNITED STATES PATENTS

| | | | |
|---|---|---|---|
| 3,308,442 | 3/1967 | Couleur et al. | 340—172.5 |
| 3,308,439 | 3/1967 | Tink et al. | 340—172.5 |
| 3,305,839 | 2/1967 | Looschen et al. | 340—172.5 |
| 3,297,996 | 1/1967 | Grady | 340—172.5 |
| 3,291,913 | 12/1966 | Hanna et al. | 179—16 |
| 3,230,509 | 1/1966 | Spencer | 340—167 |
| 3,133,268 | 5/1964 | Avakian et al. | 340—152 |
| 3,124,674 | 3/1964 | Edwards et al. | 235—61.1 |
| 2,910,238 | 10/1959 | Miles et al. | 235—167 |

GARETH D. SHAW, *Primary Examiner.*